Jan. 19, 1926. 1,570,481

F. H. GRAIN ET AL
LIQUID REGISTERING DEVICE
Filed August 28, 1924  2 Sheets-Sheet 1

Inventors:
FREDERICK HAROLD GRAIN,
LESLIE FREDERICK MAXWELL.
Attorney:

Jan. 19, 1926.

F. H. GRAIN ET AL 1,570,481

LIQUID REGISTERING DEVICE

Filed August 28, 1924    2 Sheets-Sheet 2

Inventors:
FREDERICK HAROLD GRAIN,
LESLIE FREDERICK MAXWELL.

Attorney:

Patented Jan. 19, 1926.

1,570,481

UNITED STATES PATENT OFFICE.

FREDERICK HAROLD GRAIN AND LESLIE FREDERICK MAXWELL, OF LONDON, ENGLAND.

LIQUID-REGISTERING DEVICE.

Application filed August 28, 1924. Serial No. 734,779.

*To all whom it may concern:*

Be it known that we, FREDERICK HAROLD GRAIN and LESLIE FREDERICK MAXWELL, both residing at London, England, subjects of the King of Great Britain and Ireland, have invented certain new and useful Improvements in Liquid-Registering Devices, of which the following is a specification.

This invention relates to means for the cumulative registering of liquid, such as fuel in motor vehicles.

The invention is applicable to all cases where liquid is introduced into a vessel or tank and it is desired to register the quantity of liquid introduced into, drawn off or removed over considerable periods of time, for example, the total consumption of petrol during the running life or other determined period of a motor vehicle.

The means employed produce a cumulative indication of all liquid introduced into or removed from the vessel, and these means include a float associated or co-operating with an Archimedean screw in such a manner that the rise and fall of the float according to varying liquid levels causes a rotation of the screw, the rotary movement of which is communicated to the registering mechanism, which may include a master wheel or equivalent, which in turn conveys the movement to a train of counter wheels of conventional or approved form, with transfer or carry over devices if necessary, so that, for example, each time liquid is drawn off from the vessel the falling movement of the float will operate the counting or registering devices to accumulate and totalize the quantity of liquid withdrawn in suitable units such as gallons and give a reading indication thereof in any known manner.

In addition, each time the vessel is filled or charged with liquid the rising movement of the float is caused through the same Archimedean screw to operate an indicator showing the quantity of liquid inserted, the reverse movement of the float on withdrawal of liquid also acting on said indicator to register the quantity of liquid remaining at all times up to complete emptying.

In the application of the invention to a motor vehicle the device can with advantage be applied to the filler cap or equivalent of the petrol tank, or may be made a fixture therein, or again may be connected up to give an indication on the dash or instrument board so that the total consumption of petrol at any time may be readily seen.

Figure 1:
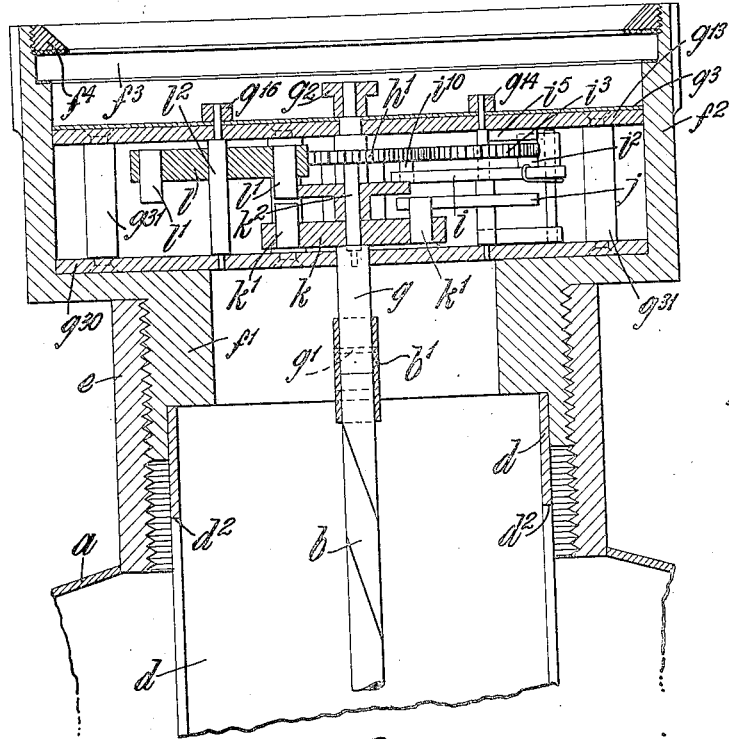
Figure 4:
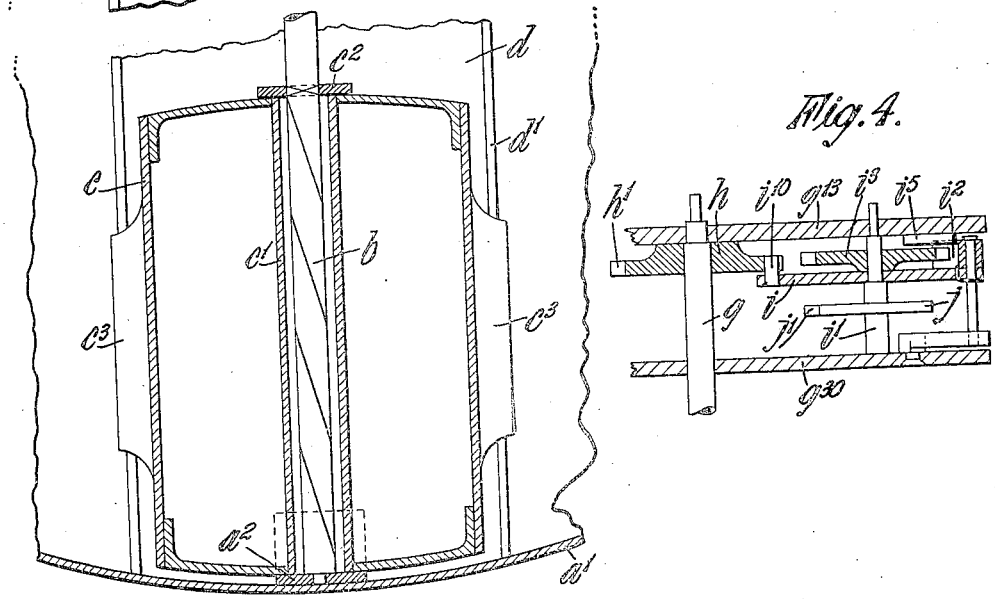
Figure 2:
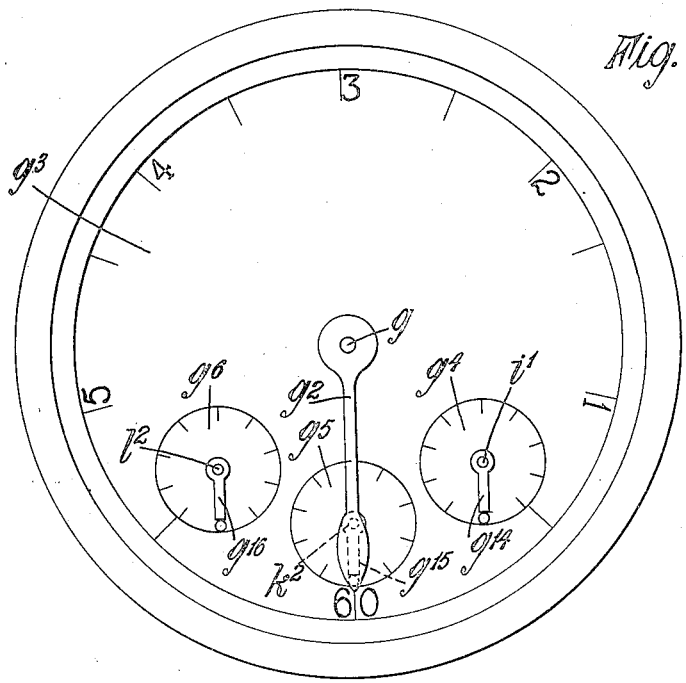
Figure 3:
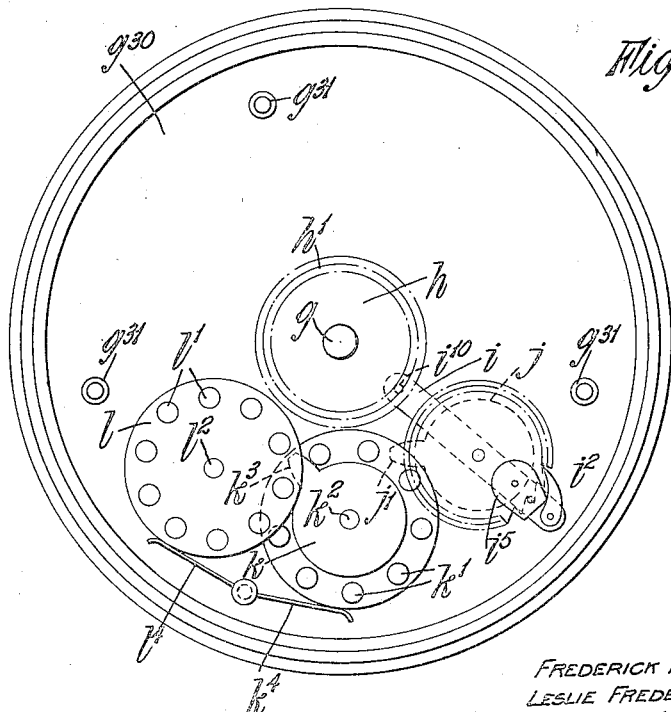

An embodiment of the invention suitable for use with the petrol tank of an automobile is illustrated in the accompanying drawings in which Fig. 1 is a vertical section through part of the tank and the registering mechanism; Fig. 2 is a plan view of Fig. 1. Fig. 3 is a plan view of parts of the registering mechanism, and Fig. 4 a partial detail section of parts of said mechanism.

In said drawings $a$ and $a^1$ designate the top and base of the tank. In the base is a step bearing $a^2$ for a worm or screw $b$ which extends upward through the central tube $c^1$ of a hollow float $c$ which is provided at the top with a nut $c^2$ engaged by the worm so that as the float rises and falls rotation is imparted to the worm. The float operates in a tubular chamber $d$ the wall of which is slotted at $d^1$ to form guides for fins $c^3$ extending from opposite sides of the float, the latter being thus prevented from rotation and its limit of rise being determined by the upper termination of the slots $d^1$ as at $d^2$.

Around the upper end of the tubular chamber $d$ the tank $a$ is provided with an interiorly threaded boss or collar $e$ into which is screwed a boss $f^1$ extending from a casing $f^2$ enclosing the registering mechanism, which is connected to the worm $b$ by means of a sleeve coupling $b^1$ which is pinned through a depending spindle $g$ as at $g^1$. The said shaft $g$ extends upwards and at its upper end carries a pointer $g^2$ which works over a dial $g^3$ supported by a plate $g^{13}$ which is graduated at its periphery to indicate the total capacity, such as 6 gallons as illustrated. This dial is also provided with units, tens and hundreds dials $g^4$, $g^5$ and $g^6$ respectively over each of which works pointers $g^{14}$, $g^{15}$, $g^{16}$ for giving a cumulative indication of consumption or withdrawal from the tank.

On the tank being filled the float $c$ rises and the worm $b$ will be rotated so that the pointer $g^2$ will move over the dial from the zero mark to indicate the extent of charging of the tank. On liquid being withdrawn, however, the accumulating or total registering mechanism will come into operation. This mechanism comprises a toothed wheel $h$ rigidly mounted on the pointer spindle $g$ and with the teeth $h^1$ (Fig. 4) of which there engages a pin $i^{10}$ carried at one end of a lever $c$ loosely pivoted on a spindle $d^1$ and carrying at its opposite end a spring pawl $i^2$ adapted to engage the teeth of a ratchet wheel $d^3$ rigidly mounted on said spindle, which carries at its upper end the pointer $g^{10}$ working over the units dial $g^c$. Co-operating with said pawl is a trip device or plate $i^3$ mounted on the underside of the plate $g^{10}$ above mentioned. This trip device prevents the pawl from moving over more than one tooth of the ratchet wheel $d^3$ at a time and prevents its engagement with said teeth during the rising movement of the float. On the same spindle $d^1$ as the ratchet wheel $d^3$ is a transfer wheel $j$ the long tooth $j^1$ of which is adapted to engage one of a series of pins $k^1$ extending upwardly from a double wheel $k$ mounted on a spindle $k^2$ which carries at its upper end the pointer $g^{16}$ working over the tens dial $g^5$. The transfer tooth $k^3$ of said double wheel engages one of a series of pins $l^1$ extending downwards from a wheel $l$ mounted on a spindle $l^2$ and carrying at its upper end the pointer $g^{16}$ working over the hundreds dial $g^6$. The tens and hundreds wheels $k$ and $l$ may be braked to prevent overthrow by means of light springs $k^4$ and $l^4$ respectively bearing on their peripheries.

It will be apparent that on withdrawal of liquid from the tank and the operation of the units, tens and hundreds pointers as described the pointer $g^3$ will also return towards zero thus always giving an indication of the amount of liquid remaining in the tank.

The plate $g^{10}$ supporting the dial $g^3$ is shown as supported from a base plate $g^{30}$ by means of pillars $g^{31}$, the said two plates affording bearing for all the spindles and enabling the registering mechanism to be mounted as a self contained unit.

The upper side of the casing $f^2$ may be enclosed by a plate of glass or the like $f^3$ held in place as by a ring $f^4$ threaded into the opening of said casing.

What we claim as our invention and desire to secure by Letters Patent of the United States is:—

1. In a liquid registering device, having a tank, a shaft, and means in the tank for rotating the shaft by the change of liquid level in said tank; a member on the shaft; a spindle; a ratchet wheel on the spindle; a pivoted lever adapted to be operatively engaged by the said member; a pawl on said lever adapted to engage the ratchet wheel; and a device adapted to limit the movement of the ratchet wheel by the pawl when the shaft turns in one direction, and to prevent engagement of the pawl with the ratchet wheel when the shaft turns in the opposite direction.

2. In a liquid registering device, having a tank, a shaft, and means in the tank for rotating the shaft by the rise of liquid in said tank; a toothed member on the shaft; a spindle; a ratchet wheel on the spindle; a pivoted lever having one end adapted to be engaged by the toothed member to move the lever in one direction; a pawl on said lever adapted to engage the ratchet wheel; and a fixed trip device adapted to prevent engagement of the pawl with the ratchet wheel when the shaft rotates in one direction, and to limit the movement of the ratchet wheel by the pawl when the shaft rotates in the opposite direction.

In witness whereof we have signed this specification.

FREDERICK HAROLD GRAIN.
LESLIE FREDERICK MAXWELL.